US010529116B2

(12) United States Patent
Gordon et al.

(10) Patent No.: US 10,529,116 B2
(45) Date of Patent: Jan. 7, 2020

(54) DYNAMICALLY TRANSFORMING A TYPING INDICATOR TO REFLECT A USER'S TONE

(71) Applicant: INTERNATIONAL BUSINESS MACHINES CORPORATION, Armonk, NY (US)

(72) Inventors: Kelley M. Gordon, Apex, NC (US); Michael Celedonia, Wake Forest, NC (US); Katelyn Applegate, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/985,870

(22) Filed: May 22, 2018

(65) Prior Publication Data
US 2019/0362532 A1 Nov. 28, 2019

(51) Int. Cl.
*G06T 13/80* (2011.01)
*G06F 17/27* (2006.01)
*H04L 12/58* (2006.01)

(52) U.S. Cl.
CPC ............ *G06T 13/80* (2013.01); *G06F 17/279* (2013.01); *H04L 51/10* (2013.01); *H04L 51/18* (2013.01)

(58) Field of Classification Search
CPC .................................................... G06T 13/80
See application file for complete search history.

(56) References Cited

U.S. PATENT DOCUMENTS

| 8,996,633 | B2 | 3/2015 | Dunko |
| 9,031,293 | B2 | 5/2015 | Kalinli-Akbacak |
| 9,569,424 | B2 | 2/2017 | Martinez |
| 2004/0064321 | A1* | 4/2004 | Cosatto ................... G10L 13/00 704/276 |
| 2004/0162877 | A1 | 8/2004 | Van Dok et al. |
| 2006/0281064 | A1* | 12/2006 | Sato ...................... G09B 23/286 434/308 |
| 2008/0201438 | A1 | 8/2008 | Mandre |

(Continued)

OTHER PUBLICATIONS

Mell et al., "The NIST Definition of Cloud Computing," U.S. Department of Commerce, National Institute of Standards and Technology, Sep. 2011, p. 1-7, Special Publication 800-145.

(Continued)

*Primary Examiner* — Jitesh Patel
(74) *Attorney, Agent, or Firm* — Kenneth Han

(57) ABSTRACT

A method, computer system, and computer program product for determining and displaying tones with messaging information are provided. The embodiment may include receiving a plurality of user-entered messaging information from a messaging application. The embodiment may also include determining a tone associated with the plurality of received user-entered messaging information. The embodiment may further include determining a color and an animation for the determined tone based on a preconfigured mapping of a plurality of colors and a plurality of animations with a plurality of tones. The embodiment may also include displaying the animation with the color on a display screen of a user device until the user submits the plurality of user-entered messaging information for transmission to one or more other users.

14 Claims, 9 Drawing Sheets

(56) References Cited

U.S. PATENT DOCUMENTS

| | | | |
|---|---|---|---|
| 2009/0117850 A1* | 5/2009 | Jokinen | H04M 1/22 455/66.1 |
| 2011/0273455 A1* | 11/2011 | Powar | G10H 1/368 345/473 |
| 2013/0231922 A1* | 9/2013 | Park | G06F 17/2735 704/9 |
| 2014/0052792 A1* | 2/2014 | Dunko | H04M 1/72547 709/206 |
| 2014/0181229 A1* | 6/2014 | Tucker | H04L 51/32 709/206 |
| 2016/0259827 A1 | 9/2016 | Beaumont et al. | |

OTHER PUBLICATIONS

Tao, "Context Based Emotion Detection from Text Input", National Laboratory of Pattern Recognition, Institute of Automation, Chinese Academy of Sciences, Published 2004 (best date available) in Interspeech, pp. 1-4.

Ku et al., "Calculating Emotional Score of Words for User Emotion Detection in Messenger Logs", National Yunlin University of Science and Technology, Taiwan, IEEE IRI 2012, Aug. 8-10, 2012, Las Vegas, Nevada, USA, pp. 138-143.

Anonymously, "Cognitive Feedback Analysis to Proactively Trigger Automatic System Modifications and User Actions", An IP.com Prior Art Database Technical Disclosure, IP.com No. IPCOM000247630D, IP.com Electronic Publication Date: Sep. 21, 2016, pp. 1-10.

Anonymously, "System and Method of Detecting Real-time Emotion in a Web Conference", An IP.com Prior Art Database Technical Disclosure, IP.com No. IPCOM000242080D, IP.com Electronic Publication Date: Jun. 18, 2015, pp. 1-6.

Foxtype, "Foxtype Editor", https://web.archive.org/web/20040325004354/http://foxtype.com:80/, printed on May 18, 2018, pp. 1-2.

Tonecheck, "ToneCheck: Don't send the wrong message", https://web.archive.org/web/20100722060551/http://tonecheck.com:80/, printed on May 17, 2018, copyright 2010 Lymbix Inc., pp. 1-2.

* cited by examiner

US 10,529,116 B2

DYNAMICALLY TRANSFORMING A TYPING INDICATOR TO REFLECT A USER'S TONE

BACKGROUND

The present invention relates, generally, to the field of computing, and more particularly to user-entered messaging systems.

User-entered messaging systems relate to a set of communication technologies used for text-based communication between two or more users over the internet or other types of networks. Messages are typically typed by a user and, when the user chooses to send, the messages are transmitted to another user. User-entered messaging systems may also include push technology to transmit messages character-by-character as they are composed in real-time communication systems. Real-time communications systems may relate to the simultaneous exchange of information over any type of telecommunications services from one user to another with negligible latency. Many user-entered messaging systems may also include a feature such as typing notifications or a typing awareness indicator which notifies one user of the state of the other user in a one-to-one chat. For example, if a user is typing or starts to type, such notifications may be displayed on the screen of the device of the other user.

SUMMARY

According to one embodiment, a method, computer system, and computer program product for determining and displaying tones with messaging information are provided. The embodiment may include receiving a plurality of user-entered messaging information from a messaging application. The embodiment may also include determining a tone associated with the plurality of received user-entered messaging information. The embodiment may further include determining a color and an animation for the determined tone based on a preconfigured mapping of a plurality of colors and a plurality of animations with a plurality of tones. The embodiment may also include displaying the animation with the color on a display screen of a user device until the user submits the plurality of user-entered messaging information for transmission to one or more other users.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
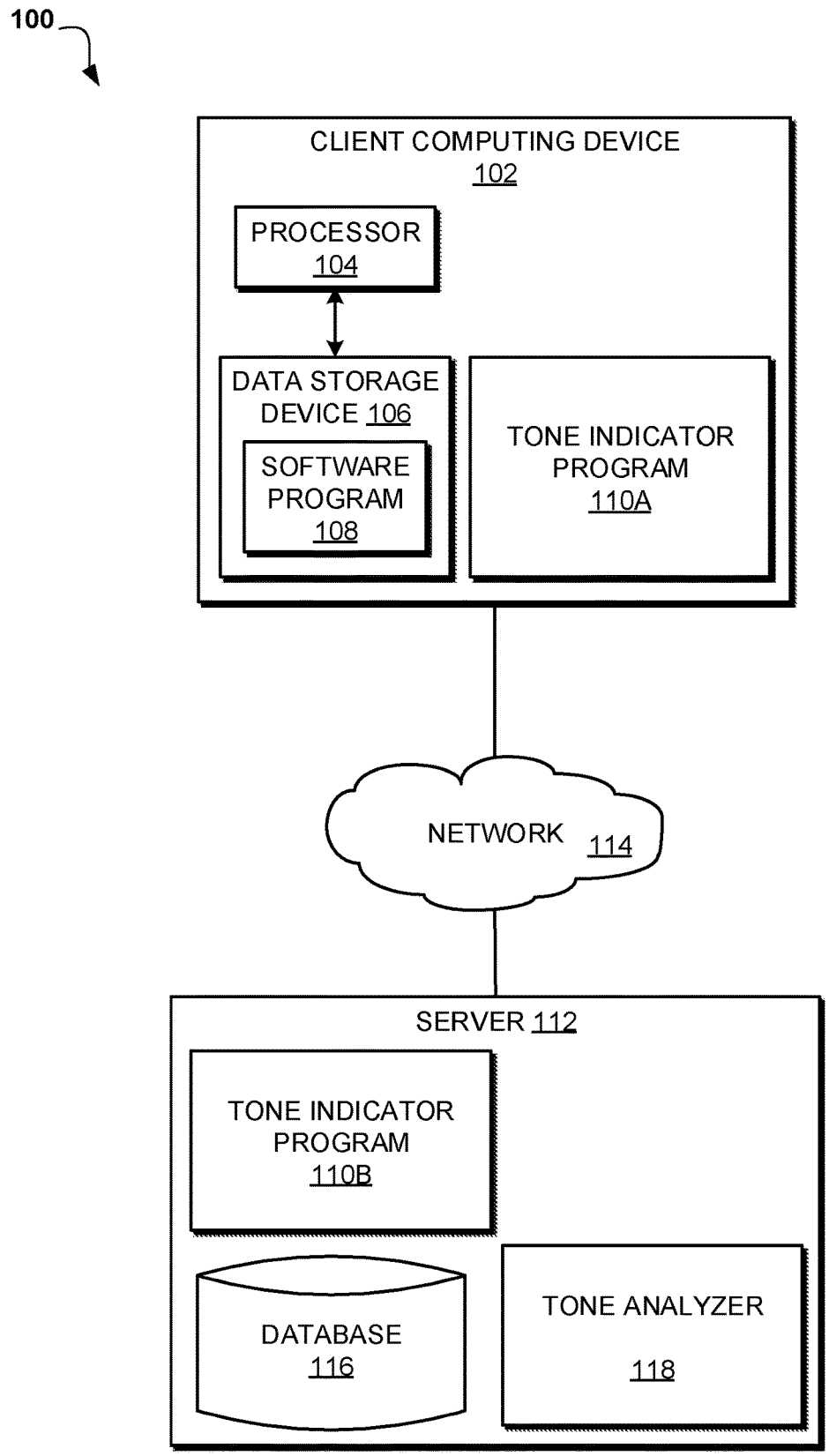
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to chat or instant messaging systems. The following described exemplary embodiments provide a system, method, and program product to, among other things, determine and display the tone and the animation associated with a user's emotion, social tendencies, and language style when he or she types text in real-time communication systems. Therefore, the present embodiment has the capacity to improve the technical field of user-entered messaging systems not only by efficiently allowing users to become aware of another user's emotion, social tendencies and language style and prepare more mindful responses but also by allowing users to become aware of their own tones as they are typing. Moreover, the present embodiment may learn and adapt to each user by identifying and storing the information with respect to the certain words or sentences that the user frequently types above a threshold number of times and adjust the weight of the tones in the subsequent conversation.

As previously described, user-typed messaging systems may relate to push technology that transmits messages character-by-character as they are composed in real-time communication systems. Real-time communications systems may relate to the simultaneous exchange of information over any type of telecommunications services from one user to another with negligible latency. Many user-typed messaging systems may also include a feature such as typing notifications or a typing awareness indicator which notifies one user of the state of the other user in a one-to-one chat. For example, if a user is typing or starts to type, such notifications may be displayed on the screen of the device of the recipient user.

Today, chat or instant text messaging is one of the most popular forms of real-time communication. Currently, many instant text messaging systems feature typing indicators which notify a recipient user when a user is typing or starts to type. However, the typing indicators do not provide insight into the emotion, social tendencies or language style of what is being typed. Rather, these programs only identify that a user is currently typing. Human conversation, whether oral or written, can be subtle if one cannot recognize the tone or emotion of the speaker or the author. As such, it may be advantageous to, among other things, implement a system capable of providing a method for which the sent text has real-time tonal awareness and allowing the recipient user to have insight into the tone of what the sender is typing in real-time and prepare more mindful and considerate responses.

According to one embodiment, a user-entered messaging information may be analyzed by a tone indicator program to determine emotional, social and language tone reflected in the messaging information. The database may use information from each receipt to select and assign colors and/or animations from preconfigured tones or emotions. Additionally, the text information may be stored in the database and the system may learn and adapt to each user's communication styles or behaviors. For example, if a user frequently types exclamation points and uses smiley faces, the system will understand this to be a common behavior of the user and the system will adjust the tone output based on this understanding.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify and display emotional, social and/or language tones reflected in the text messaging between users.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a tone indicator program 110A and communicate with the server 112 via the communication network 114, in accordance with one embodiment of the invention. The software program 108 may be web-based applications such as WeChat® (WeChat and all WeChat-related trademarks and logos are trademarks or registered trademarks of Tencent Holdings Limited. and/or its affiliates), WhatsApp® (WhatsApp and all WhatsApp-related trademarks and logos are trademarks or registered trademarks of WhatsApp, Inc. and/or its affiliates), and Snapchat® (Snapchat and all Snapchat-related trademarks and logos are trademarks or registered trademarks of Snap, Inc. and/or its affiliates). The tone analyzer 118 may be a program such as the IBM Watson® Tone Analyzer (IBM Watson and all IBM Watson-related trademarks and logos are trademarks or registered trademarks of International Business Machines Corporation and/or its affiliates). Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a tone indicator program, 110B, a tone analyzer 118 and a database 116 and communicating with the client computing device 102 via the communication network 114, in accordance with embodiments of the invention. The tone analyzer 118 may be a program capable of determining appropriate emotional, social and/or language tones reflected in the text messages and interacting with the tone indicator program 110B. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the tone indicator program 110A, 110B may be a program capable of determining and displaying tones reflected in user-entered messaging information. The tone indicator program 110A, 110B may then generate a database that maintains information relevant to the communication styles or behaviors of the user so that the tone indicator program 110A, 110B may adjust the weight of tones in subsequent communications. The tone indication process is explained in further detail below with respect to FIG. 2.

Figure 2:
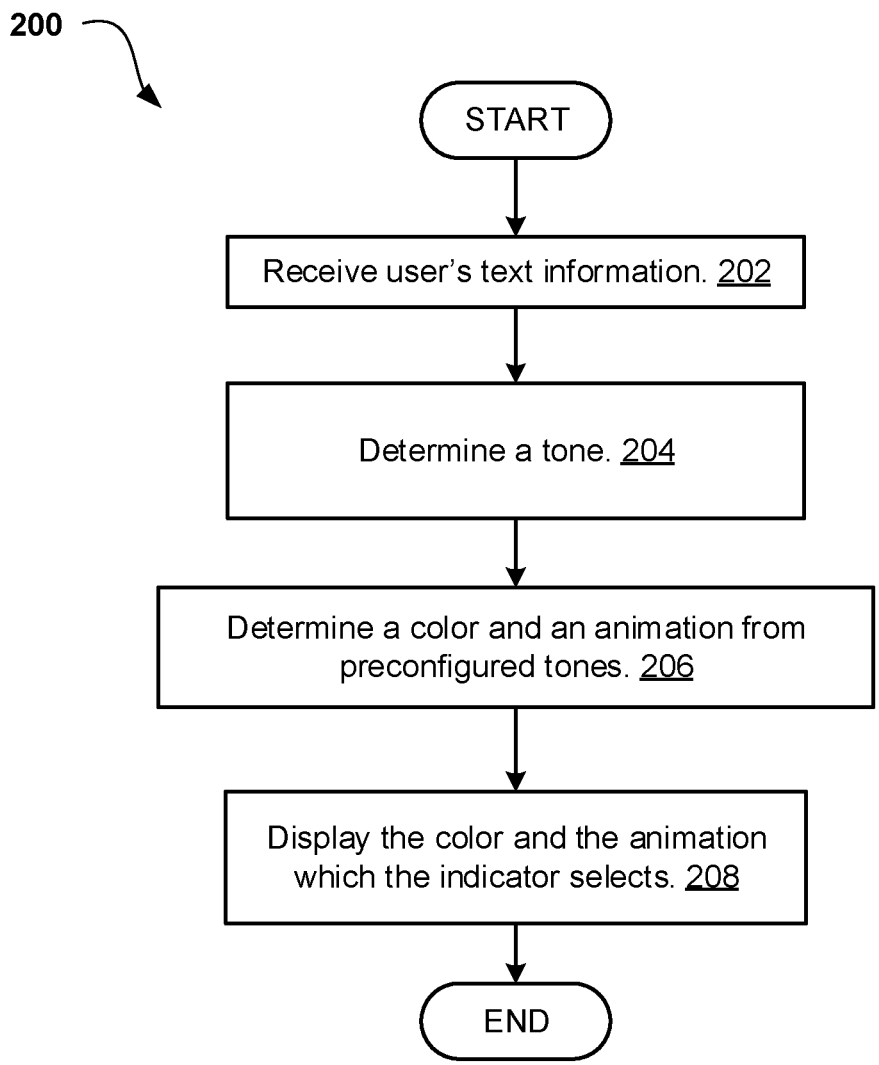
FIG. 2 is an operational flowchart illustrating a tone indication process according to at least one embodiment.

FIG. 2 is an operational flowchart illustrating a tone indication process 200 according to at least one embodiment. At 202, the tone indicator program 110A, 110B receives user-entered messaging information as a user starts to type in the chat or instant messaging systems. Today, instant messaging is very popular because it is more interactive than email for both personal and business communication purposes. Instant messages are exchanged immediately whereas email may be queued up in a mail server. Many people use smartphones and more people are sending text messages through web-based applications such as WeChat®, WhatsApp®, and Snapchat®. For example, if user A wants to share some personal story with user B and wants to initiate a real-time conversation, user A may start to type "Hello, I have some good news!" utilizing one of the above web-based applications. The tone indicator program 110A, 110B then receives the user-entered messaging information and prepares to transmit the information for analysis. In at least one embodiment, the tone indicator program 110A, 110B may receive user-entered messaging information from any other messaging program capable of transmitting messages between users, such as email messages, tweets, social media posts, forum posts, and user comments to articles or blog posts. Furthermore, user-entered messaging information may include text, images, GIFs, emojis, and emoticons.

At 204, the tone indicator program 110A, 110B determines a tone of the user-entered messaging information by utilizing the tone analyzer 118. The tone analyzer 118 may include a program such as the IBM Watson® Tone Analyzer. Furthermore, the tone analyzer 118 may be capable of determining a tone from text, images, videos, emojis, or emoticons. The tone may be an emotional tone, a language tone, and a social tone. With respect to the emotional tones, the tone analyzer 118 may be capable of determining various emotions, such as positive emotions and negative emotions. Positive emotions may refer to emotions such as joy, optimism, contentment, inspiration, and happiness. Negative emotions may include anger, aggression, hostility, feelings of fear, disgust, despair, guilt, rejection, and humiliation. With respect to the social tones, the tone analyzer 118 may be capable of determining openness, agreeableness, and conscientiousness. With respect to the language tones, the tone analyzer 118 may be capable of determining analytical, confident and tentative tones. The analytical tone may show a person's reasoning and analytical attitude about things. The confidence tone may indicate the degree of certainty exhibited by an individual towards something. The tentative tone may show the attitude of inhibition. For example, after user A typed, "Hello, I have some good news!", the tone analyzer 118 receives such text message information from the tone indicator program 110A, 110B and determines a positive tone or a cheerful emotion.

At 206, the tone indicator program 110A, 110B determines a color and an animation associated with the user-entered messaging information in accordance with the determined tones. The colors may include green, yellow, red, orange purple, pink, grey or blue. The animations may include a sphere or an oval that bounces up and down in a slow, medium fast, fast, very fast, sudden or irregular manner. These colors and animations may be mapped in the database 116 to certain emotions from the above description when an emotion is determined by the tone analyzer 118. For example, if user A types "Hello. I have some good news!", the tone indicator program 110A, 110B may determine that the user tone is happy or excited, and the tone indicator program 110A, 110B may determine that an animation which bounces in a light manner depicted in a green or yellow color is appropriate for display. For an angry or upset tone, the tone indicator program 110A, 110B may determine to use a red or orange color with an animation that moves in a sudden or impatient manner. For a confused tone, the tone indicator program 110A, 110B may determine to use a purple or pink color with an animation that moves in a more erratic and disorganized manner. For a sad tone, the tone indicator program 110A, 110B may determine a blue color with an animation that moves in a slow or gloomy manner should be displayed. The tone indicator program 110A, 110B may determine the tones by taking on qualities anywhere within the gradient of the emotions. In other words, the tone indicator program 110A, 110B may reanalyze the tone after the users type additional words or sentences to check if the particular tones or emotions have changed. For example, if user A types first "I am so tired" and then types "But I think I am happy because today is Friday!", then the tone indicator program 110A, 110B may detect the tone gaining happiness or cheerfulness, and the color may shift to green and yellow to display a happier or more cheerful emotion. In at least one embodiment, the tone indicator program 110A, 110B may determine a combination of emotions by selecting a preconfigured color and an animation independently. For example, if the tone indicator program 110A, 110B detects a combined measurement of angry and confused emotion, the tone indicator program 110A, 110B may display the color assigned to angry with an animation assigned to confused emotion. Additionally, the tone indicator program 110A, 110B may learn and adapt to communication styles or behaviors of each user based on the messaging information entered by each user. Data gathered from each user may be tied to the corresponding user ID stored in the database 116.

In at least one embodiment, the tone indicator program 110A, 110B may determine tones of multiple messages for multiple users. Many web-based instant messaging applications may include a group chat feature where three or more individuals exchange the text information simultaneously. The tone indicator program 110A, 110B may determine the tones of the multiple users simultaneously as the messaging information is entered by each user, and display the appropriate colors and animations related to each user. The tone indicator program 110A, 110B may display the color and the animation associated with each user's message information within the individual dialogue box assigned to each user.

Next, at 208, the tone indicator program 110A, 110B displays the determined color and animation on the display screen of the client computing device 102 for both the sender and the recipient. For example, as user A types "Hello. I have some good news!", a green color sphere bouncing in a light manner may be displayed on the display screens of both user A and user B. As user B replies by typing "I have some bad news . . . ", a blue sphere bouncing in a gloomy manner may be displayed on the display screen of the client computing device 102 for user A and user B.

Figure 3A:
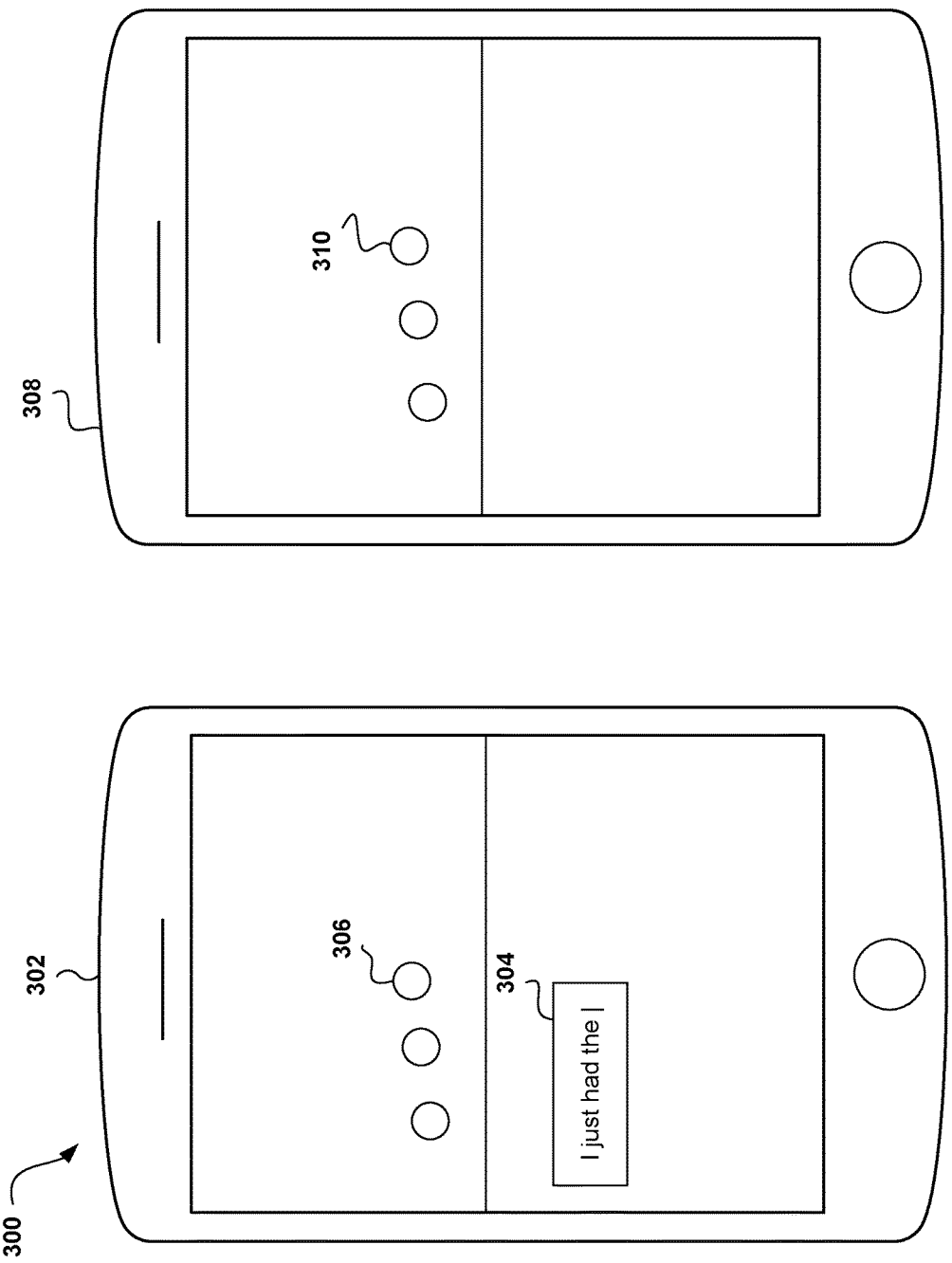
FIG. 3A-3D illustrate examples of displaying colors and animations associated with the tones of the text typed by users according to at least one embodiment.

Referring now to FIG. 3A, a diagram illustrating an example of a display process 300 is depicted according to at least one embodiment. While participating in an exchange, the device of user A 302 may receive the text information from the tone indicator program 110A, 110B as user A starts to type the text 304 which reads "I just had the". Next, the tone indicator program 110A, 110B, utilizing the tone analyzer 118, may determine that the tone is neutral, and the tone indicator program 110A, 110B may display a neutral or grey color and the sphere-shaped animation 306 in a static state on the display screen of the device 302. Also, the tone indicator program 110A, 110B may display the same color and the animation 310 on the display screen of the device of user B 308.

Figure 3B:
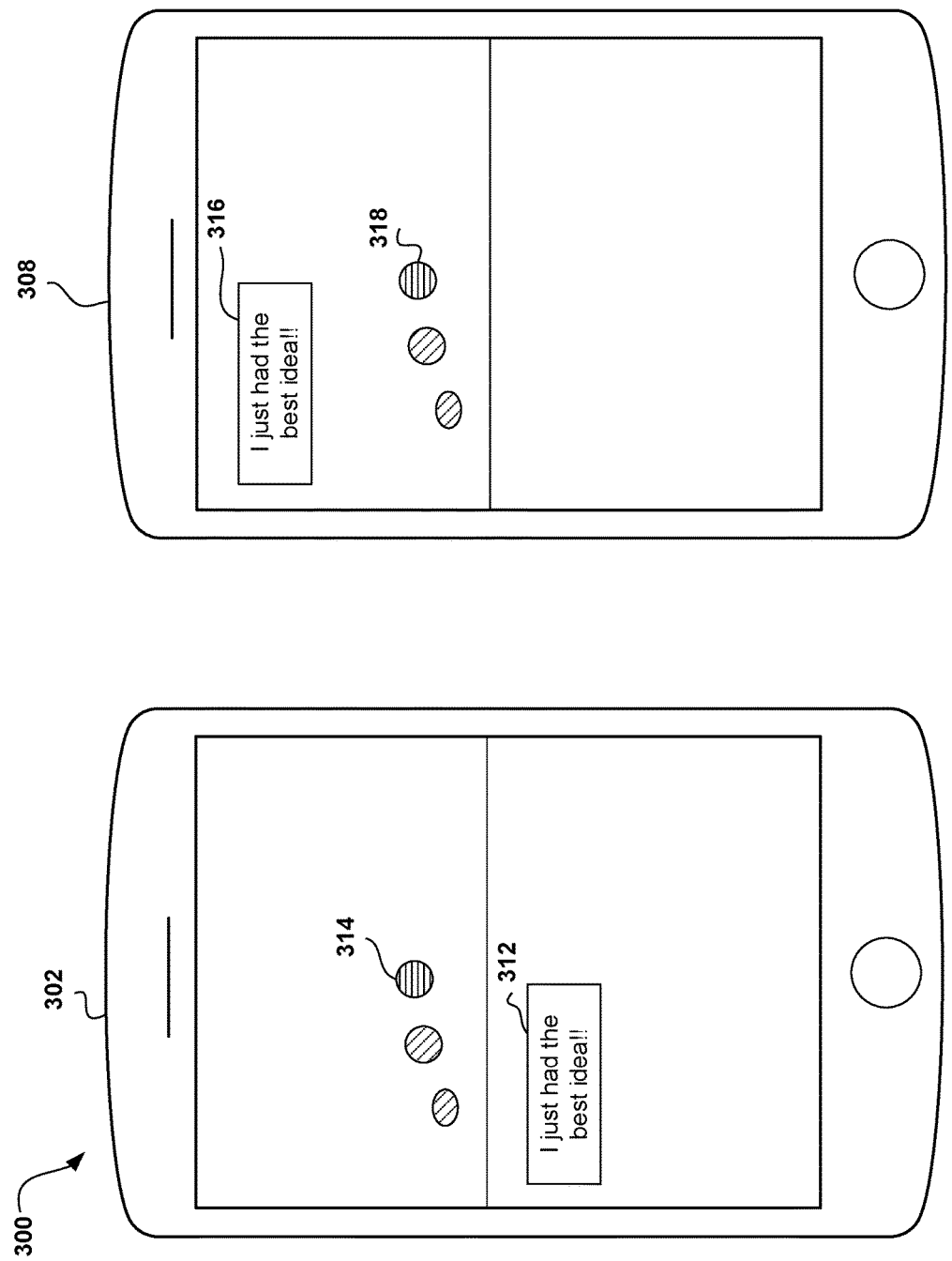

Referring now to FIG. 3B, a diagram illustrating another example of a display process 300 is depicted according to at least one embodiment. As user A finishes typing "I just had the best idea", the tone indicator program 110A, 110B may display the text 312 on the display screen of the device 302. The tone indicator program 110A, 110B, utilizing the tone analyzer 118 may determine the cheerful and upbeat tone is appropriate, and the tone indicator program 110A, 110B may display a yellow or green color with an oval and/or sphere-shaped animation 314 bouncing in a light manner. Next, the tone indicator program 110A, 110B may display the text 316 and the animation 318 in the same color on the display screen of the device of user B 308.

Figure 3C:
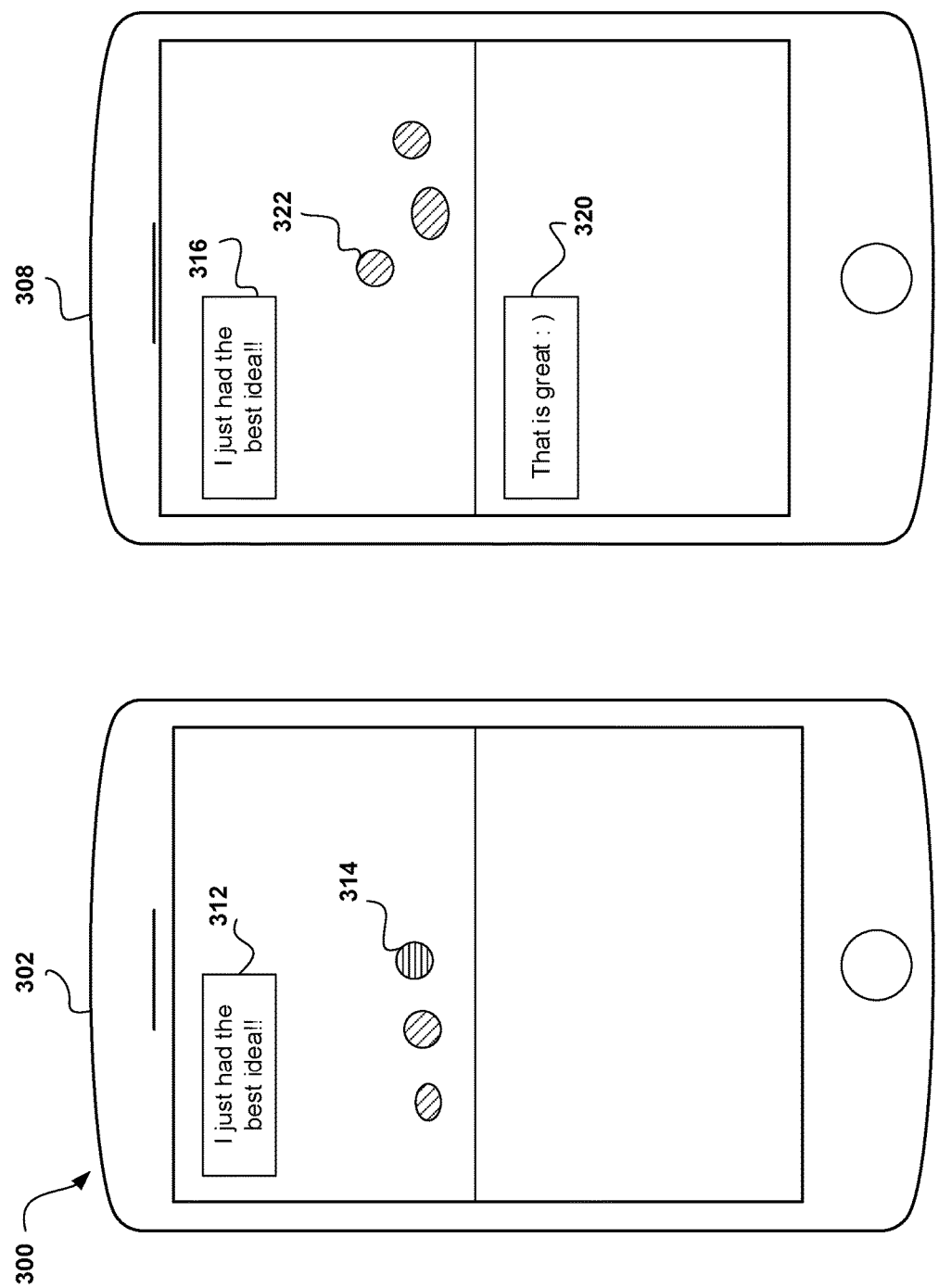

Referring now to FIG. 3C, a diagram illustrating a different example of a display process 300 is depicted according to at least one embodiment. After user A finishes typing "I just had the best idea! !", the text information 312 is displayed on the display screen of the device of user A 302, and the determined color and the animation 314 remains the same on the display screen. The text 316 is also displayed on the upper section of the display screen of the device of user B 308. Next, user B types the text 320 "That is great:)", and the tone indicator program 110A, 110B, utilizing the tone analyzer 118 may determine a happy tone and the tone indicator program 110A, 110B may display a yellow or green color and an animation 322 which bounces in a more upbeat manner on the display screen of the device 308.

Figure 3D:
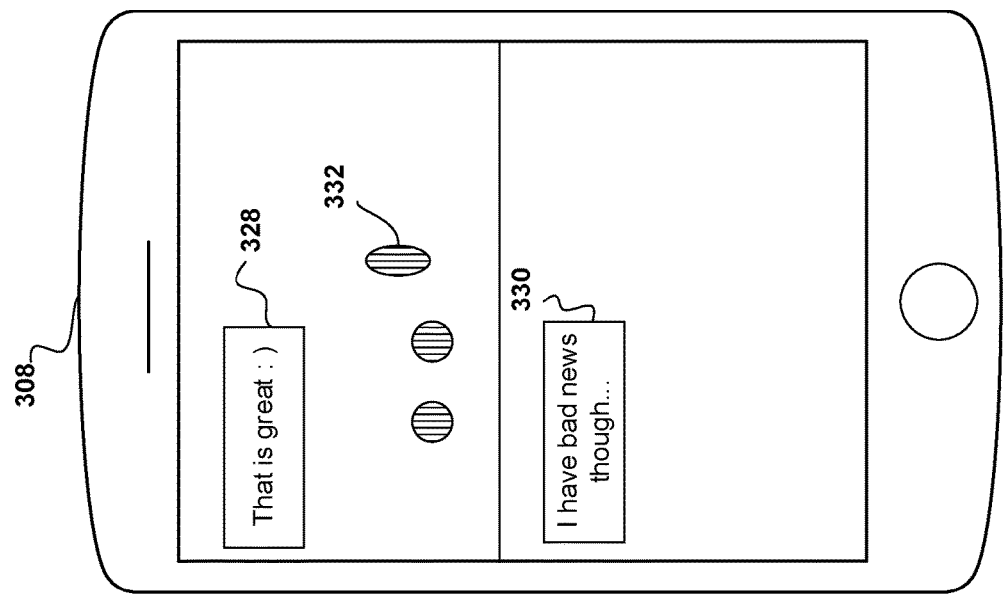
Figure 3D:
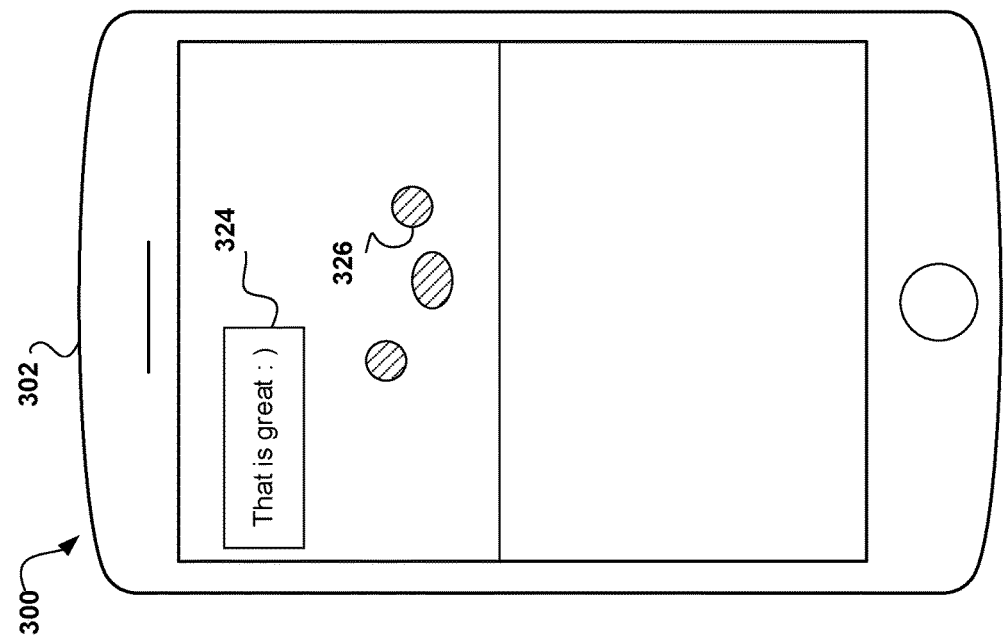

Referring now to FIG. 3D, a diagram illustrating a different example of a display process 300 is depicted according to at least one embodiment. The tone indicator program 110A, 110B may display the text information 324 and the color and the animation 326, which the tone indicator program 110A, 110B previously determined by utilizing the tone analyzer 118, on the display screens of the device of user A 302 and the device of user B 308. Next, user B may type the text 330 "I have bad news though . . . ", and the tone indicator program 110A, 110B may receive the text information and determine a sad tone. The tone indicator program 110A, 110B may then display a blue color and an animation 332 that moves in a more slow and gloomy manner on the display screen of the device of user B 308.

It may be appreciated that FIGS. 2-3 provide only an illustration of one implementation and do not imply any limitations with regard to how different embodiments may be implemented. Many modifications to the depicted environments may be made based on design and implementation requirements. Although many examples are stated towards chat or instant messaging systems, the tone indicator program 110A, 110B may also be implemented for any type of messaging systems, such as social networking systems, collaborative note-taking tools or email.

Figure 4:
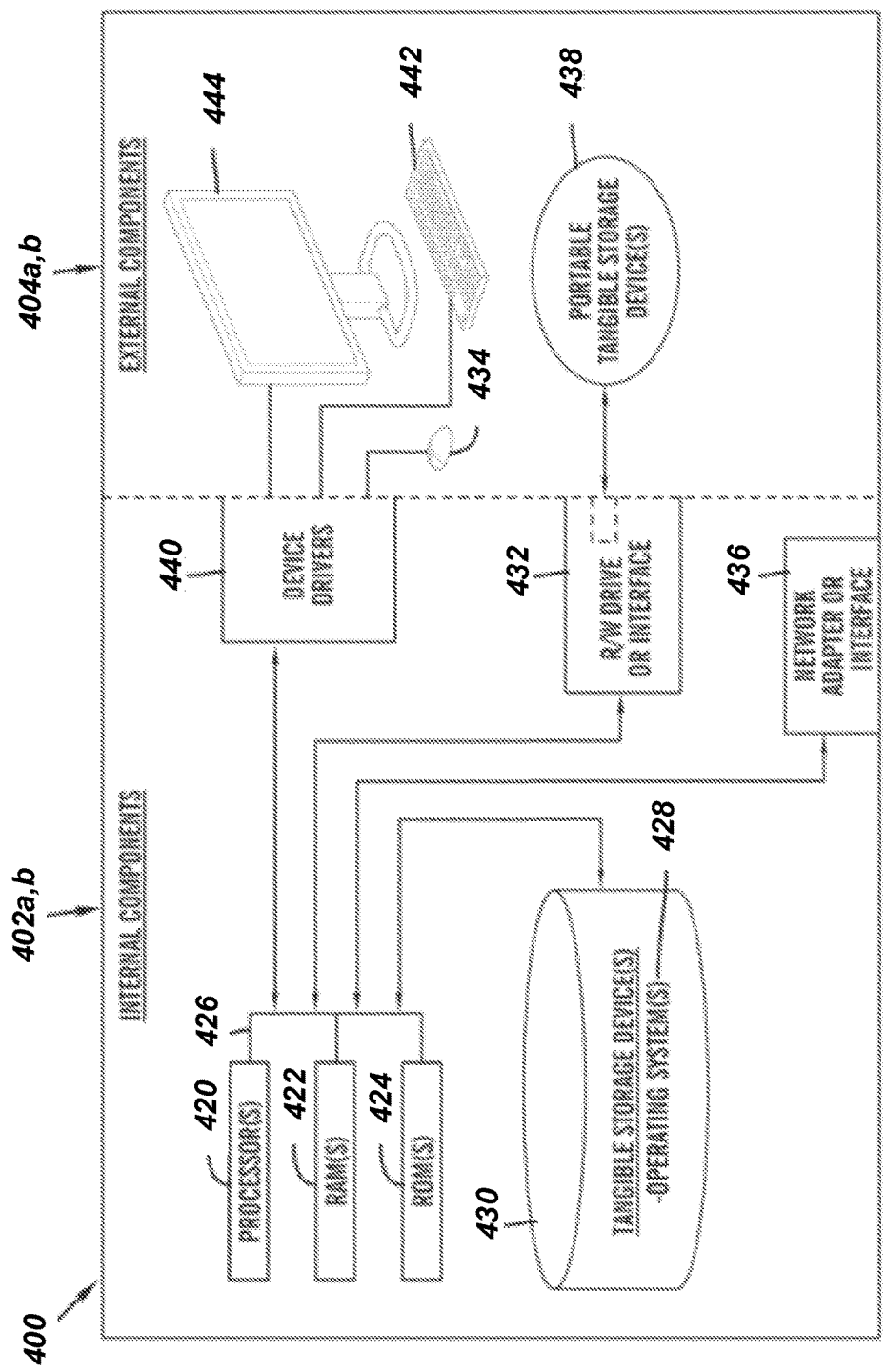
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the tone indicator program 110A in the client computing device 102 and the tone indicator program 110B and the tone analyzer 118 in the server 112 are stored on one or more of the respective computer-readable tangible storage devices 430 for execution by one or more of the respective processors 420 via one or more of the respective RAMs 422 (which typically include cache memory). In the embodiment illustrated in FIG. 8, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the tone indicator program 110A, 110B, can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the tone indicator program 110A in the client computing device 102 and the tone indicator program 110B and the tone analyzer 118 in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the tone indicator program 110A in the client computing device 102 and the tone indicator program 110B and the tone analyzer 118 in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
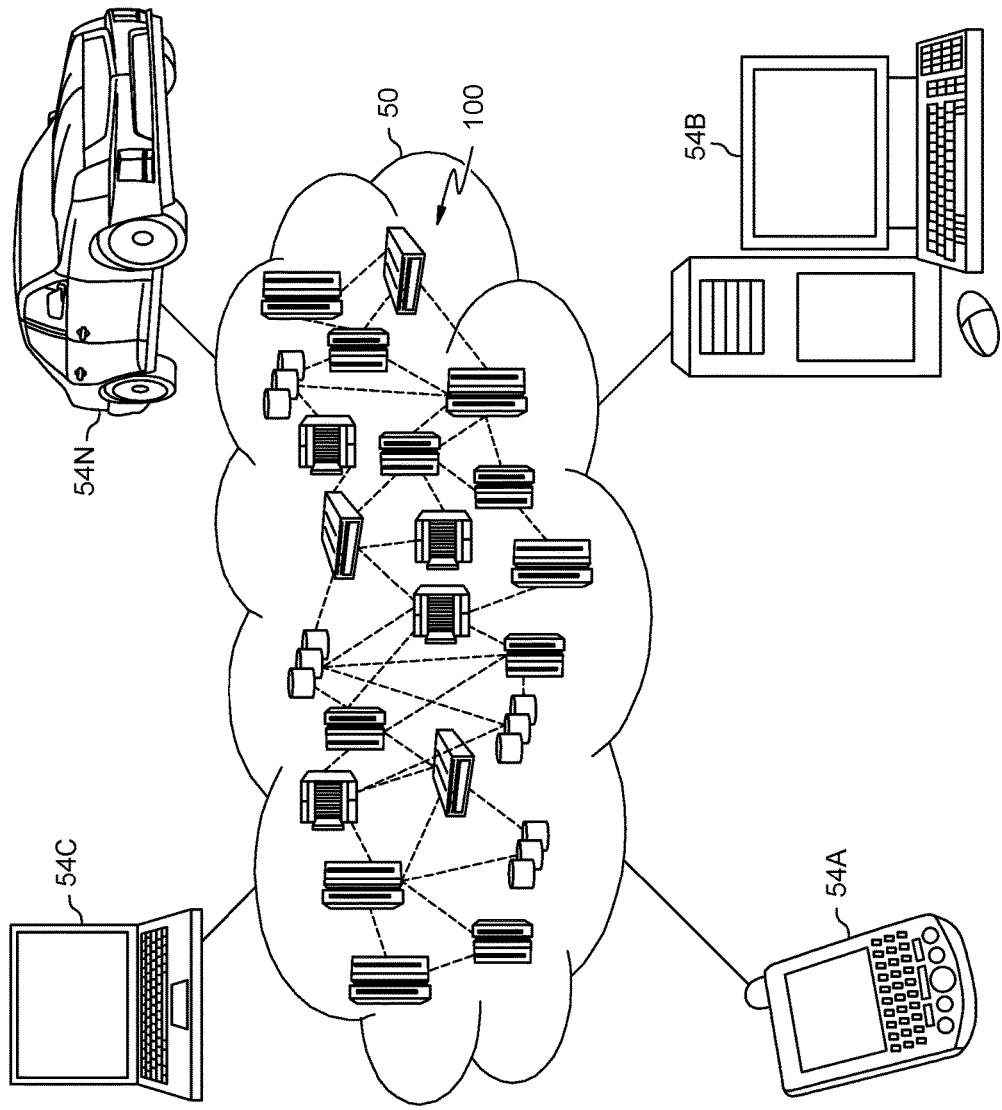
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
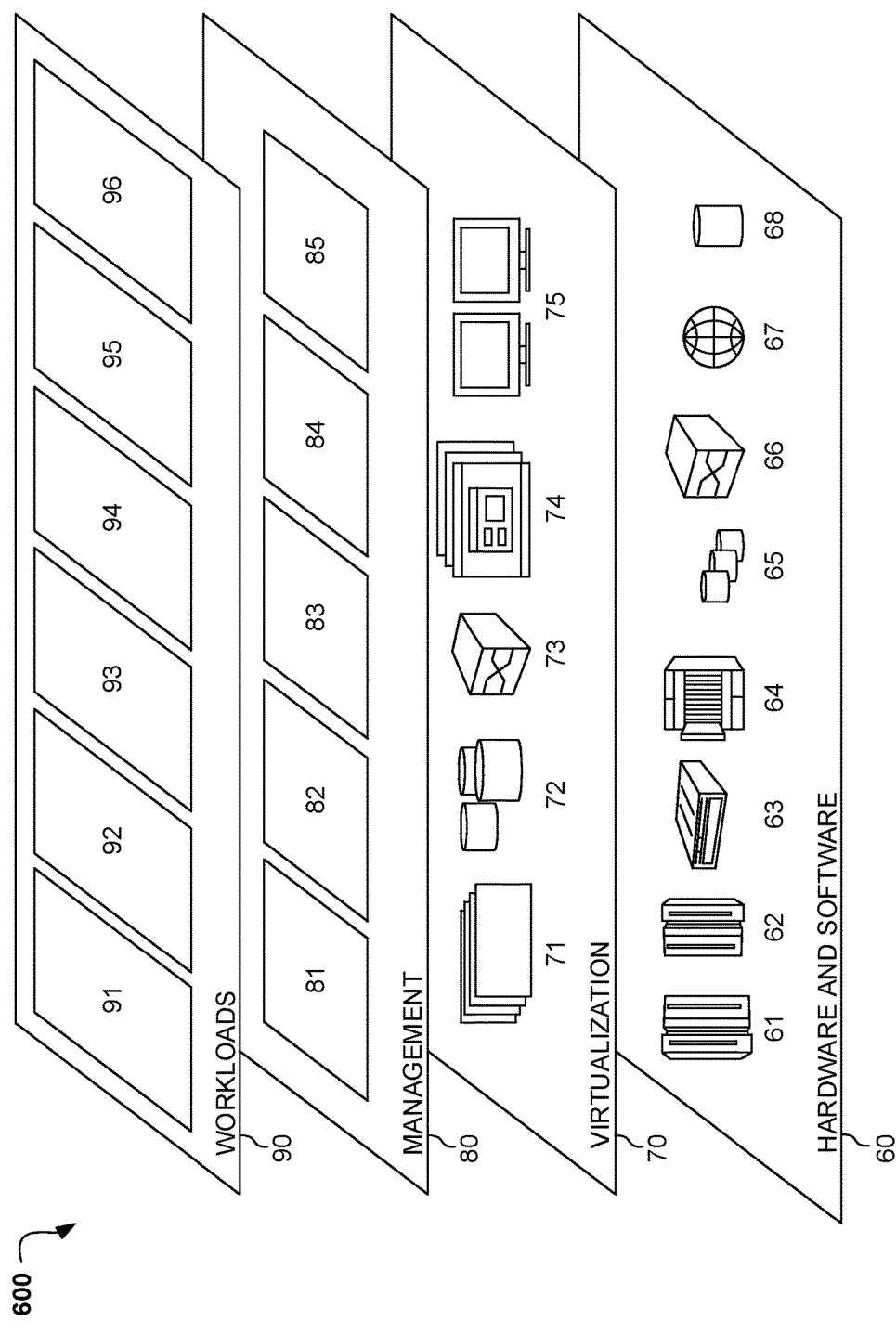
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tone indication 96. Tone indication 96 may relate generating a database of messaging information previously entered by a user, monitoring various databases for appropriate tones associated with the user-entered messaging information so that tone indication 96 may adjust the weight of the tones of the messaging information which the user enters in the future.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining and displaying tones associated with text information, the method comprising:
    receiving, by a processor, a plurality of user-entered messaging information from a messaging application;
    determining a tone associated with the plurality of received user-entered messaging information, wherein the tone is determined using a tone analyzer;
    in response to a word, a phrase, or an image in the plurality of user-entered messaging information being used above a threshold number of times by the user:
        storing the plurality of user-entered messaging information and the determined tone in a repository; and
        setting and storing a weight to apply to the determined tone in a future communication;
    determining a color and an animation for the determined tone based on a preconfigured mapping of a plurality of colors and a plurality of animations with a plurality of tones; and
    displaying the animation with the color on a display screen of a user device until the user submits the plurality of user-entered messaging information for transmission to one or more other users.

2. The method of claim 1, wherein the messaging system is a real-time communication system selected from a group consisting of an instant messaging system, a short messaging system (SMS), an email messaging system, a social networking system, a forum, and a user comment thread.

3. The method of claim 1, wherein the tone comprises an emotional tone, a social tone, and a language tone.

4. The method of claim 2, wherein the plurality of user-entered messaging information is received from multiple users, further comprising:
    determining a separate tone for the plurality of user-entered messaging information associated with each of the multiple users as the plurality of user-entered messaging information is simultaneously entered by each user;
    determining a color and an animation for each of the multiple users based on the preconfigured mapping; and
    displaying each color and each animation in appropriate locations of the display screen where each user may be identified as each plurality of user-entered messaging information is typed.

5. The method of claim 2, further comprising:
    in response to receiving a plurality of subsequent user-entered messaging information:
        adjusting the tone based on the plurality of subsequent user-entered messaging information;
        determining an updated color and an updated animation based on the adjusted tone; and
        displaying the adjusted animation with the adjusted color.

6. A computer system for determining and displaying tones associated with text information, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
    receiving, by a processor, a plurality of user-entered messaging information from a messaging application;
    determining a tone associated with the plurality of received user-entered messaging information, wherein the tone is determined using a tone analyzer;
    in response to a word, a phrase, or an image in the plurality of user-entered messaging information being used above a threshold number of times by the user:
        storing the plurality of user-entered messaging information and the determined tone in a repository; and
        setting and storing a weight to apply to the determined tone in a future communication;
    determining a color and an animation for the determined tone based on a preconfigured mapping of a plurality of colors and a plurality of animations with a plurality of tones; and
    displaying the animation with the color on a display screen of a user device until the user submits the plurality of user-entered messaging information for transmission to one or more other users.

7. The computer system of claim 6, wherein the messaging system is a real-time communication system selected from a group consisting of an instant messaging system, a short messaging system (SMS), an email messaging system, a social networking system, a forum, and a user comment thread.

8. The computer system of claim 6, wherein the tone comprises an emotional tone, a social tone, and a language tone.

9. The computer system of claim 8, wherein the plurality of user-entered messaging information is received from multiple users, further comprising:
    determining a separate tone for the plurality of user-entered messaging information associated with each of the multiple users as the plurality of user-entered messaging information is simultaneously entered by each user;
    determining a color and an animation for each of the multiple users based on the preconfigured mapping; and
    displaying each color and each animation in appropriate locations of the display screen where each user may be identified as each plurality of user-entered messaging information is typed.

10. The computer system of claim 8, further comprising:
    in response to receiving a plurality of subsequent user-entered messaging information:
        adjusting the tone based on the plurality of subsequent user-entered messaging information;
        determining an updated color and an updated animation based on the adjusted tone; and
        displaying the adjusted animation with the adjusted color.

11. A computer program product for determining and displaying tones associated with text information, the computer program product comprising:
   one or more computer-readable tangible storage media and program instructions stored on at least one of the one or more tangible storage media, the program instructions executable by a processor of a computer to perform a method, the method comprising:
   receiving, by a processor, a plurality of user-entered messaging information from a messaging application;
   determining a tone associated with the plurality of received user-entered messaging information, wherein the tone is determined using a tone analyzer;
   in response to a word, a phrase, or an image in the plurality of user-entered messaging information being used above a threshold number of times by the user:
   storing the plurality of user-entered messaging information and the determined tone in a repository; and
   setting and storing a weight to apply to the determined tone in a future communication;
   determining a color and an animation for the determined tone based on a preconfigured mapping of a plurality of colors and a plurality of animations with a plurality of tones; and
   displaying the animation with the color on a display screen of a user device until the user submits the plurality of user-entered messaging information for transmission to one or more other users.

12. The computer program product of claim 11, wherein the messaging system is a real-time communication system selected from a group consisting of an instant messaging system, a short messaging system (SMS), an email messaging system, a social networking system, a forum, and a user comment thread.

13. The computer program product of claim 11, wherein the tone comprises an emotional tone, a social tone, and a language tone.

14. The computer program product of claim 12, wherein the plurality of user-entered messaging information is received from multiple users, further comprising:
   determining a separate tone for the plurality of user-entered messaging information associated with each of the multiple users as the plurality of user-entered messaging information is simultaneously entered by each user;
   determining a color and an animation for each of the multiple users based on the preconfigured mapping; and
   displaying each color and each animation in appropriate locations of the display screen where each user may be identified as each plurality of user-entered messaging information is typed.

* * * * *